April 3, 1951  A. MILLETTE  2,547,652
PICKER SHAFT SUPPORTING MEANS
Filed Sept. 1, 1948  4 Sheets-Sheet 1

INVENTOR.
Adolph Millette
BY
Thomas A. Jenckes
Attorney

April 3, 1951  A. MILLETTE  2,547,652
PICKER SHAFT SUPPORTING MEANS
Filed Sept. 1, 1948  4 Sheets-Sheet 2

INVENTOR.
Adolph Millette
BY
Thomas A. Jencke
Attorney

INVENTOR.
Adolph Millette
BY
Thomas A. Jenckes
Attorney

INVENTOR.
Adolph Millette
BY
Thomas A. Jenckes
Attorney

Patented Apr. 3, 1951

2,547,652

UNITED STATES PATENT OFFICE 2,547,652

PICKER SHAFT SUPPORTING MEANS

Adolph Millette, Central Falls, R. I.

Application September 1, 1948, Serial No. 47,238

16 Claims. (Cl. 139—147)

My invention relates to improvements in picker shaft supporting means.

At the present time each picker shaft extends transversely along the inner surface of each end wall of a loom frame and is supported at each end thereof by brackets projecting inwardly from the frame end walls. Each picker shaft is provided preferably adjacent the rear end thereof with an operating shoe projecting inwardly therefrom which is forcibly struck by an arm on each end of the main loom drive shaft as it rotates to forcibly rotate the picker shaft sufficiently and with such speed and force as to cause the actuating arm projecing upwardly therefrom to sharply actuate a lug strap connected to a respective picker stick to cause the picker stick to oscillate sharply to throw the shuttle over the lay of the loom. The drive shaft rotates at a substantial speed and during each revolution thereof its respective arm strikes a picker shaft shoe with substantial force at its weakest point near the centre thereof.

During the many years experience of the applicant in fixing looms, he has discovered that there were many causes of shut-downs or breakages which seemed to be absolutely unexplainable, such as a slow down on the start of the shuttle, thus preventing it from going into the box far enough to cause the loom to bang off and stop, causing the bands on the ends of the beam or warp to slip making light or heavy or uneven places in the cloth. Prior loom fixers to obviate this difficulty would attempt to increase the power by lowering the lug strap on the picker stick, which caused the filling to kink in the cloth, thereby causing an imperfection which had to be mended, an expensive process. When the shuttle did not go into the box far enough the end of the shuttle would not clear the end of the race plate on the lay, thereby causing the shuttle to break or the picker stick to break, the head motion to go out of time or to make a smash in the cloth, and if this occurred at the magazine side, a bad doff and a smash at the same time would occur.

It was also observed that if the shuttle did not pass over the lay at a fast enough speed, it would tend to fly out and hit the side of the magazine and break either the shuttle or the magazine, or if it flew out on the opposite side, it would fly through the air and might hit anyone in the vicinity and cause them injury.

After observing many of these defects for years and after carefully studying the action of many looms, I discovered that a bent, sprung or warped picker shaft was the cause of most of these troubles, in that it has become so weakened that it not only delays the start of the shuttle, which causes it to lose speed going across the shed and not going into the box far enough, but also causes it to pass at such a lowered speed that the above mentioned accidents will take place, and on further analysis the applicant discovered that bent, sprung or warped picker shafts were due to the fact that they were unsupported at their centre portions adjacent the points at which the shoes thereof received the continued, closely repeated, sharp blows from the arm of the rotating drive shaft, and I visualized that if the picker shafts were rigidly supported at this point the cause of the aforementioned defects would be obviated.

Objects of my invention, therefore, are to provide such a strong support for the centre portion of each picker shaft that it will not become bent, sprung or warped in use, and thereby prevent all defects of the type beforementioned due to bent picker shafts delaying the start of the shuttle, delaying the speed of the shuttle, causing bang off of the loom, slippage of the warp, causing uneven places in the cloth, kinkage of the filling in the cloth, breakage of the shuttle or picker stick, loss of timing of the head motion, smashes in the cloth, bad doffs and prevention of the shuttle from flying out of the shed injuring not only itself but also the magazine and possibly any operative that might be in the vicinity and in general obviate many of the causes of stoppages or bad weaving in a loom which had hitherto been unexplainable.

A further object of my invention is to provide not only a supporting bracket for the picker shaft, but also one that will be self-lubricating to function a long time in use.

A further object of my invention is to provide a supporting bracket for the centre of each picker shaft which may be either initially built into the loom, or sold as an attachment to be attached to existing looms.

A further object of my invention is to provide a supporting bracket for the centre of a picker shaft which becomes self-aligning in use and will automatically adjust itself through the medium of a universal connection for variations in the relative alignment of the loom and frame and picker shaft as the end bearings thereof may vary in use or for any other reason.

Further features of my invention relate to the inherent structure of the various types of supporting preferably shelf-lubricating brackets I employ which may be fabricated for use with either square or round picker shafts.

A further object of my invention is to provide a supporting bracket having a single point of connection, so that it may be tilted relative to the frame to be further brought into alignment with the picker shaft.

These and such other objects of my invention as may hereinafter appear will be best understood from a description of the accompanying drawings which illustrate embodiments thereof.

In the drawings, Fig. 1 is a diagrammatic view taken transversely through parts of the loom and looking towards the inner surface of an end wall of the frame, having its picker shaft and operating parts mounted thereon and illustrating my improved supporting bracket in use with a picker shaft square in section, or having a plurality of flat sides.

Figure 1:
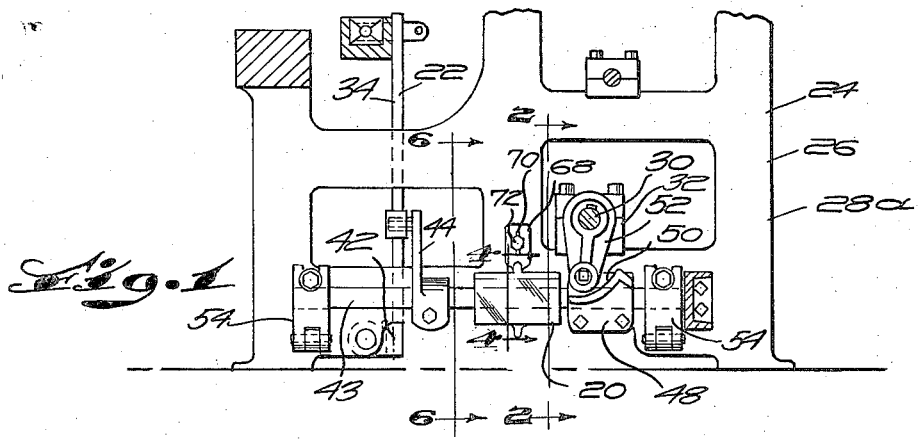
Figure 2:
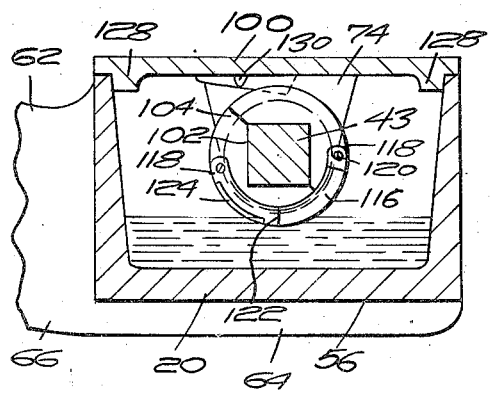
Fig. 2 is a transverse sectional view through my improved bracket taken along the line 2—2 of Fig. 1, illustrating the bucket thereof at the initiation of the partial rotation of the picker shaft.
Figure 3:
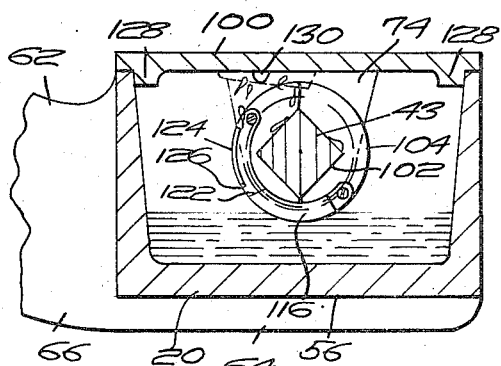
Fig. 3 is a transverse sectional view of the same parts shown in Fig. 2 after the picker shaft is revolved substantially 45° in use and illustrating how it throws oil from the bucket up and over the bearing parts at the end of its stroke.
Figure 4:
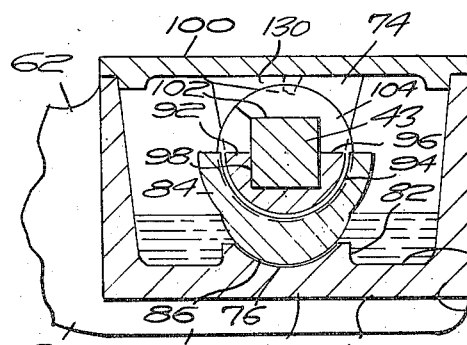
Fig. 4 is a transverse sectional view taken centrally through my improved bracket along the line 4—4 of Fig. 1.
Figure 5:
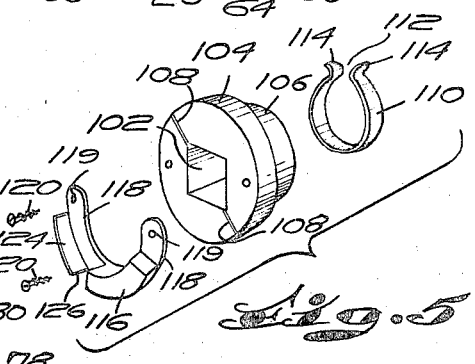
Fig. 5 is an exploded view of my improved washer, clamp, bucket and chute which I employ with my invention.
Figure 9:
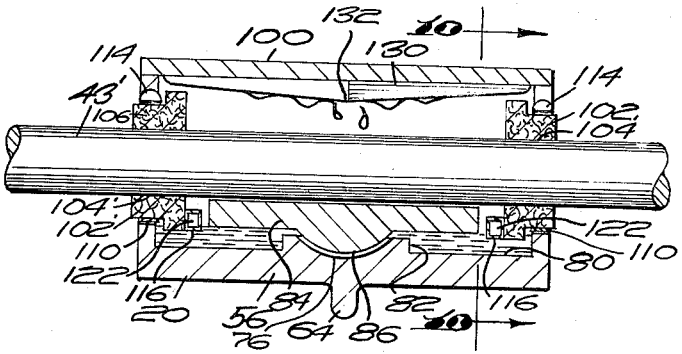
Fig. 9 is a longitudinal sectional view taken substantially centrally of my improved bracket housing, generally similar to Fig. 7 but illustrating an embodiment of my invention adapted for use with round picker shafts.
Figures 10, 11:
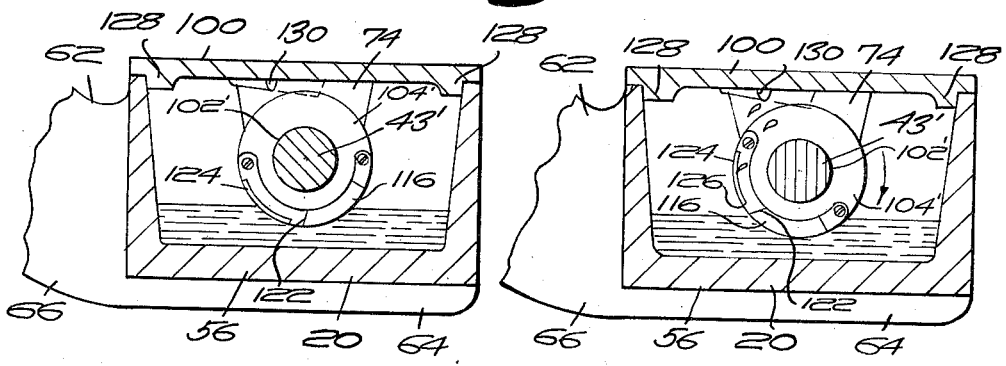
Fig. 10 is a transverse sectional view similar to Fig. 2 taken along the line 10—10 of the embodiment shown in Fig. 9, prior to any movement of the picker shaft.
Fig. 11 is a transverse sectional view of the parts shown in Fig. 10 immediately after the actuation of the picker shaft, illustrating how the oil is thrown to lubricate the parts of the bearings of this embodiment.

In the drawings, wherein like characters of reference generally indicate like parts throughout, 20 generally indicates a central supporting bracket for each picker shaft constructed in accordance with my invention. As stated, my invention is adapted for use on a picker motion 22 for a loom 24 having a frame 26, having the walls 28a and 28b at each end thereof, a main drive shaft 30 extending longitudinally of said loom mounted on suitable bearings 32 on said end walls 28a and 28b, a picker stick 34 at each end of the loom pivotally mounted as at 36 on a projection 38 projecting outwardly from each end of the lay, having means such as the spring 40 to urge its inner end 42 to its innermost position. Such a loom is also provided with a picker shaft 43 extending transversely of each end of the loom immediately inside each end wall 28a and 28b, each having an actuating arm 44 projecting upwardly therefrom connectable to a lug strap 46 connected to the picker stick 34 and having a shoe 48 rigidly mounted thereon, having a usual forwardly and downwardly inclined arcuate upper cam surface 50 projecting inwardly thereof. Each end of the drive shaft 30 has mounted thereon a shoe actuating arm 52 which on rotation of the drive shaft 30 is adapted to contact the upper cam surface 50 of each shoe 48 sharply to sharply oscillate it inwardly on each rotation of the drive shaft to rotate each picker shaft 40°–60°, 45° as shown, to urge the actuating arm 44 sharply inwardly to urge the upper end of the picker stick 34 inwardly through the medium of the connecting lug strap 46. As usual, the brackets 54 are provided projecting inwardly from the front and rear of each end wall 28a and 28b supporting the ends of each picker shaft 43. With this construction, it is obvious that the arm 52 sharply contacts the shoe 50 adjacent the unsupported centre portion of said picker shaft 43 and, as stated previously, I have discovered that many of the faults in looms causing stoppage of the loom, breakage of the various parts thereof and imperfections in the cloth have been due to bent, sprung or warped picker shafts, and to improve this condition I have provided the central supporting bracket 20 for each picker shaft 43 substantially adjacent each shoe 48 so as to provide a means of support for each picker shaft adjacent the portion thereof subject to the most wear and rough treatment in use to prevent its being sprung, bent or warped in use and causing many of the imperfections hitherto set forth.

While my improved bracket 20 may be constructed in any suitable manner, it is preferably constructed in the manner now to be described.

I provide the housing 56 preferably of generally rectangular oblong shape mounted in any suitable manner on the inner surface of a frame end wall 28a or 28b and having an open top 58. In the embodiment shown, my improved housing 56 is mounted on a frame end wall 28a as follows: The frame end wall 28a is provided with a suitable bolt hole centrally thereof immediately above the desired position of the housing 56 in use. The housing 56 is provided with the central supporting arm 62 having a portion 64 projecting forwardly as a fin underneath the centre portion of said housing 56 and a flat portion 66 projecting rearwardly and outwardly centrally therefrom terminating in the flat portion 68 having the elongated vertical slot 70 therein. I preferably employ a single bolt 72 passing through said slot 70 having a suitable nut on the end thereof so that the position of the housing 56 may be vertically adjustable on the end wall 28a and may also, if desired, be tiltably adjusted thereon to vary the angle at which the housing 56 is mounted on the frame end wall 28a.

Each end wall of the housing is provided with the open portion 74 preferably being bowed from the upper surface thereof and cut away as shown to receive the picker shaft 43 therethrough, whether it comprises the square shaped embodiment of picker shaft 43 shown in Figs. 1–8, or the round embodiment of picker shaft 43' shown in Figs. 9–13. Said housing 56 is adapted to contain liquid lubricant such as oil in use therein to within a spaced distance below the lower ends of said open portions 74 and is preferably provided with the central partially spherical socket 76 in the upper surface of the lower wall 78 thereof being preferably raised from said upper surface 80 in the embodiment shown by being provided in a boss 82 projecting upwardly from said upper surface 80.

I also provide a floating semi-cylindrical bearing member 84 for each picker shaft 43 or 43', having a cooperating partially spherical protuberance 86 projecting downwardly substantially centrally of the lower wall thereof fitting into said partially spherical socket 76 to permit a slight universal tilting of said bearing member 84.

In the embodiment shown in Figs. 9–13, the round picker shaft 43' is directly supported on the inner surface of said bearing member 84, and for this purpose said bearing member has no end walls.

In the embodiment shown in Figs. 1–8, however, said bearing member 84 is provided with the end walls 88 having open cut away portions 90 preferably downwardly bowed, as shown, centrally of the upper ends thereof to receive the picker shaft therein. In this embodiment, I also provide a supplemental semi-cylindrical bearing member 92 of a length substantially the distance between the end walls 88 of said bearing member 84 contained within the hollow upper surface 94 of said semi-cylindrical bearing member 84 between the end walls 88 thereof and having an upper surface 96 comprising broken lines in the embodiment shown formed as a square to provide a longitudinal socket 98 shaped to receive the flat sides of the lower portion of the square sectioned picker shaft 43 therein and I also provide a suitable cover 100 for said housing 56.

In the embodiment shown in Figs. 9–13, the supplemental cylindrical bearing member 92 is omitted and the end walls 88 of the bearing member 84 are omitted, with the upper surface 94 being suitably grooved to receive the round picker shaft 43' therein.

I also provide means actuated on rotation of each picker shaft to throw oil over said bearing members 84, and 92 where employed. In both embodiments, said means is substantially similar with the exception that the hole 102 in the washer member 104 of the embodiment shown in Figs. 1–8 is square, as shown, whereas the hole 102' of the washer member 104' of the embodiment shown in Figs. 9–13, is round. In both embodiments I employ a centrally split cylindrical washer member 104 or 104' for each end of said picker shaft 43 or 43' within the housing 56 exterior of said floating bearing member 84 and adjacent the end wall of the housing to dam the flow of lubricant therebetween, having reduced portions 106 projecting outwardly therefrom through the open portion 74 of each housing end wall. As stated, said washers 104 and their corresponding reduced portions 106 are centrally split by the diametric slit 108, so that they may be readily attached and removed from the housing 56.

I employ means to clamp said split portions together preferably extending around the split reduced portions 106 thereof. While any suitable means for this purpose may be provided, I preferably provide the clamp means 110 in the nature of a bicycle pants clamp, comprising a spring ring split as at 112 and having the outwardly projecting ends 114.

Figure 12:
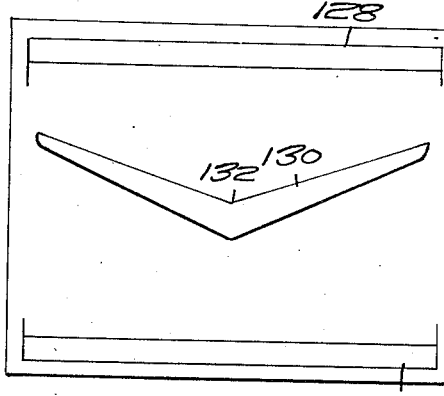
Fig. 12 is a reverse plan view of the inside of the cover of my improved housing.
Figure 13:
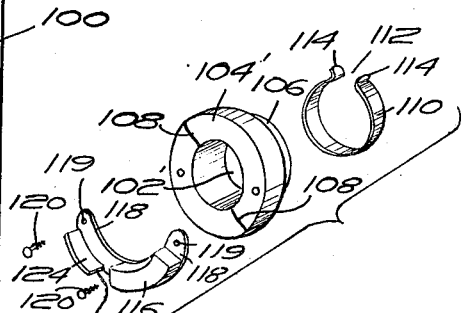
Fig. 13 is a diagrammatic perspective view of the parts of the improved washer, clamp, bucket and chute employed with the embodiment of my invention shown in Figs. 9–11.
Figure 6:
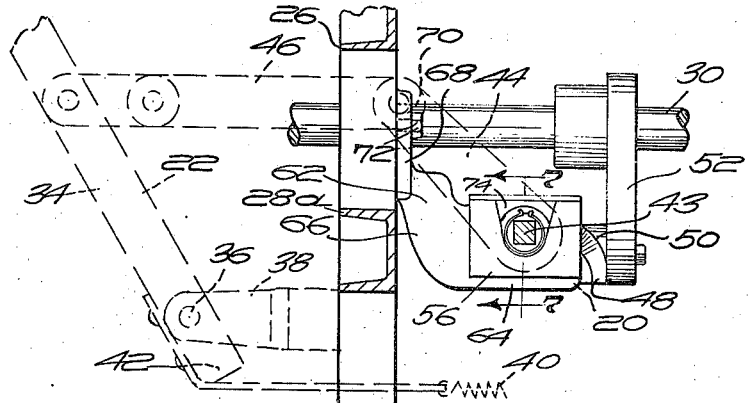
Fig. 6 is a diagrammatic transverse longitudinal sectional view looking through one end of the loom along the line 6—6 of Fig. 1, and having a portion of the picker stick and its operating parts in dotted lines.
Figure 7:
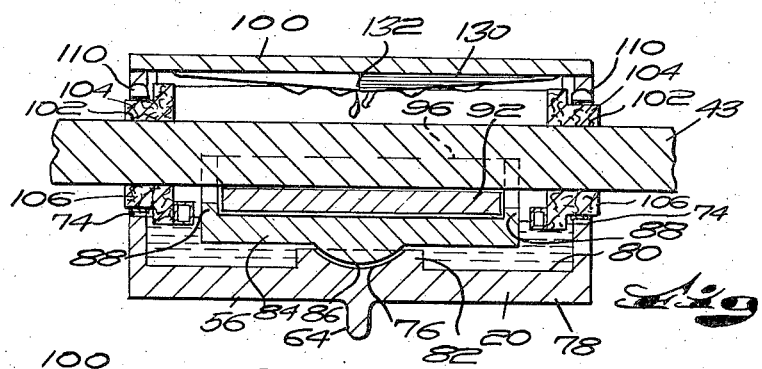
Fig. 7 is a longitudinal sectional view through the length of my improved bracket taken along the line 7—7 of Fig. 6.
Figure 8:
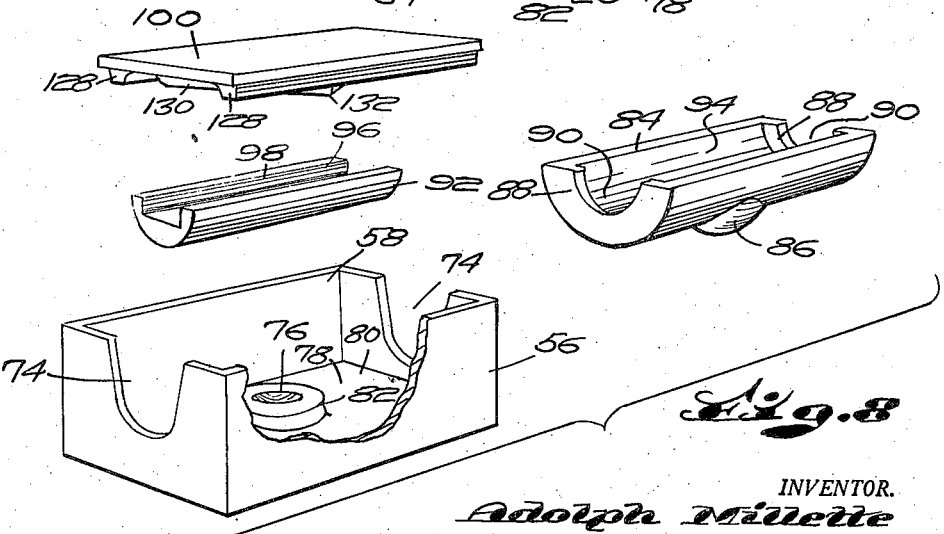
Fig. 8 is an exploded perspective view of the parts of my improved bracket housing exclusive of the washer shown in Fig. 5.
Figure 14:
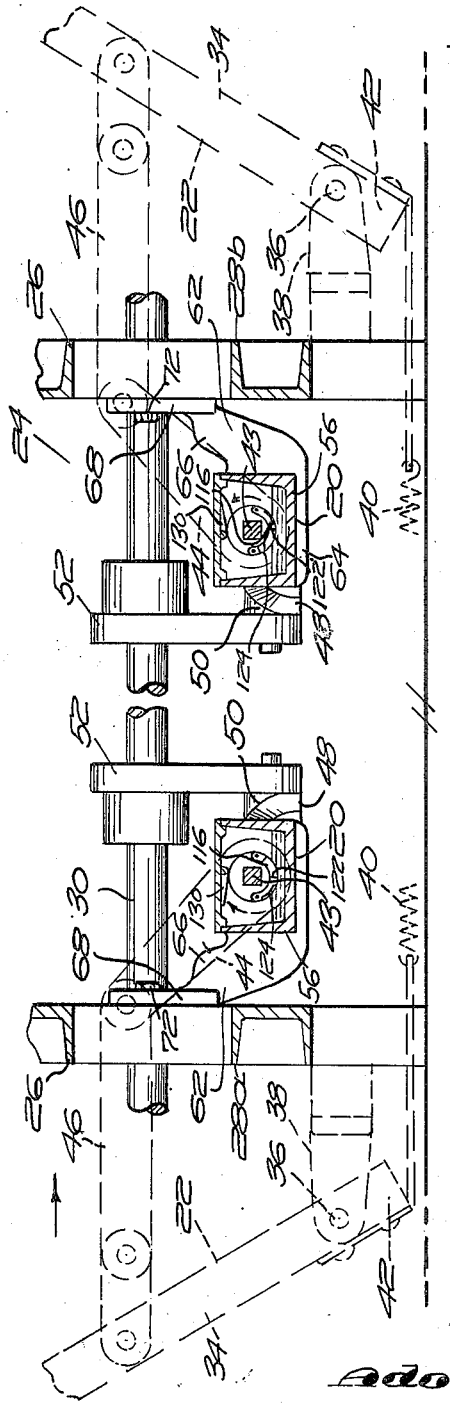
Fig. 14 is a diagrammatic front elevational view taken longitudinally through the front of a loom essentially duplicating Fig. 6 and illustrating how the buckets of my invention and the picker sticks carrying the same rotate in opposite directions on different ends of the loom employing the square shaft embodiment of the picker shaft shown in Figs. 1–8.

To throw the oil, I provide a bucket 116 of elongated shape arcuately built to fit around the inner edge surface of the enlarged portion 104 of the washer for this purpose having an extension 118 provided with a suitable hole 119 for receiving a small screw 120 for attachment thereof to the inner wall of said washer 102. Each bucket has an open end 122, as shown in Fig. 14, facing in a vertical position in the direction of rotative movement of its picker shaft prior to oscillation by its respective picker arm taking the respective positions 122, as shown, at the left in Fig. 14 and 122', as shown, at the right in Fig. 14 facing in opposite directions on different respective ends of the loom. Thus, each bucket 116 is adapted to be filled with lubricant as it is oscillated by the picker shaft through its oscillation of 40–60° to splash lubricant upwardly and outwardly over said bearing members. For this purpose, I preferably supplementally provide an arcuate chute 124, comprising a lip 124 on the outer edge of the exterior base 118, with its lower end 126 terminating at a spaced distance from the adjacent open end 122 of the bucket 116 to guide the lubricant as it passes from the open end 122 of said bucket 116 arcuately upwardly and outwardly so that it will abut the lower surface of the cover 100 to splash the oil downwardly over said bearing members 84 and 92. The cover 100 for said housing 56 may, if desired, as shown in Fig. 12, have flanges 128 projecting downwardly along each edge thereof to abut the inner surface of the side walls of the housing and with the lubricant deflecting strips 130 projecting downwardly transversely thereof in V shape formation, with the inner ends thereof forming the tip 132 of the V, with the strips projecting laterally and outwardly from said tip to provide the body of the V substantially above the end of the chute 124 at the end of its stroke. It is obvious, however, that any other suitable type of lubricating and deflecting means or oil splashing means may be provided or any other suitable means may be provided to guide oil to lubricate the contacting surfaces of the picker shaft 43 or 43', of the cylindrical bearing member 84 and of the cylindrical supplemental bearing member 92 where employed.

It is apparent that with this construction, the bearing member 84, due to the universal joint formed by its projection 86 functioning in its socket 76, provides means whereby the picker shaft 43 or 43' is initially adjusted and maintained in the desired straight line position relative to the end wall 28a or 28b of the loom frame, and that with this construction it may yield slightly in use to retain these parts generally in alignment. It is also obvious that due to the single bolt connection 70 when employed supplemental adjustments for this purpose may be additionally made.

It is apparent, therefore, that I have provided a novel type of supporting bracket for supporting the centre portions of each picker shaft adjacent the point of impact of the picker arm 52 against its respective shoe 50 to prevent bent, sprung or warped picker shafts in use, thereby obviating all dangers to machinery and operatives and all imperfections in the cloth due to bent, sprung or warped picker shafts in the manner hitherto described and a novel type of lubricating and supporting bracket as it supports said picker shaft, with the other advantages set forth above.

It is understood that my invention is not limited to the specific embodiments shown and that various deviations may be made therefrom without departing from the spirit and scope of the appended claims.

What I claim is:

1. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, said picker shaft having a plurality of flat sides, and brackets projecting inwardly from the front and rear of each frame end wall for supporting the ends of each picker shaft, a central supporting bracket for each picker shaft substantially adjacent each shoe, comprising a generally rectangular housing, having an open top, a supporting arm projecting upwardly and outwardly centrally therefrom, having a single bolt hole therein and having downwardly bowed cutaway portions centrally of the upper portion of each end wall thereof to receive the picker shaft therethrough, adapted to contain liquid lubricant in use therein to within a spaced distance below the lower ends of the open portions and a central, partially spherical socket raised from the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, said end walls also having downwardly bowed cutaway portions centrally of the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein and a centrally split cylindrical washer for each end of said picker shaft within the housing exterior of said floating bearing member and adjacent the end wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing, having lubricant deflecting strips projecting downwardly transversely thereof in V shaped formation, with the tip of the V substantially centrally thereof and the body of the V substantially above the end of the chute at the end of its stroke and single bolt means to tiltably adjustably mount the arm of each bearing bracket on its loom end frame.

2. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, and brackets projecting inwardly from the front and rear of each frame side wall for supporting the ends of each picker shaft, a central supporting bracket for each picker shaft substantially adjacent each shoe, comprising an open housing, mounted on a frame end wall, having an open top, open portions centrally of the upper portion of each end wall thereof to receive the picker shaft therethrough, adapted to contain liquid lubricant in use therein to within a spaced distance below the lower ends of the open portions and a central partially spherical socket in the upper surface of the lower wall thereof, a floating semi-cylindrical bearing member for each picker shaft, having a cooperating partially spherical protuberance projecting downwardly substantially centrally of the lower wall thereof fitting into said partially spherical socket to permit a slight universal tilting of said bearing member and a cover for said housing.

3. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, said picker shaft having a plurality of flat sides, and brackets projecting inwardly from the front and rear of each frame side wall for supporting the ends of each picker shaft, a central supporting bracket for each picker shaft substantially adjacent each shoe comprising an open housing mounted on a frame end wall, having an open top, open portions centrally of the upper portion of each end wall thereof to receive the picker shaft therethrough, adapted to contain liquid lubricant in use therein to within a spaced distance below the lower ends of the open portions and a central partially spherical socket in the upper surface of the lower wall thereof, a floating semi-cylindrical bearing member for each picker shaft, having end walls and a cooperating partially spherical protuberance projecting downwardly substantially centrally of the lower wall thereof fitting into said partially spherical socket to permit a slight universal tilting of said bearing member, said end walls also having open portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein, and a cover for said housing.

4. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft and brackets projecting inwardly from the front and rear of each frame side wall for supporting the ends of each picker shaft, a central supporting bracket for each picker shaft substantially adjacent each shoe, comprising an open housing mounted on a frame end wall having an open top, a supporting arm projecting upwardly and outwardly centrally therefrom, having a single bolt hole therein and having open portions centrally of the upper portion of each end wall thereof to receive the picker shaft therethrough, adapted to contain liquid lubricant in use therein to within a spaced distance below the lower ends of the open portions and a central, partially spherical socket in the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member, a cover for said housing and single bolt means to tiltably adjustably mount the arm of each bearing bracket on the loom and frame.

5. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, and brackets projecting inwardly from the front and rear of each frame side wall for supporting the ends of each picker shaft, a central supporting bracket for each picker shaft substantially adjacent each shoe, comprising an open housing mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket raised from the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, and a cover for said housing.

6. In a picker motion for a loom having a frame having end walls, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, and brackets projecting inwardly from the front and rear of each frame side wall for supporting the ends of said picker shaft, a central supporting bracket for each picker shaft substantially adjacent each shoe, comprising a housing, mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket in the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member, and a centrally split cylindrical washer for each end of said picker shaft within the housing adjacent the side wall to dam the flow of lubricant, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket and a cover for said housing, having lubricant deflecting strips projecting downwardly transversely thereof in V shaped formation, with the tip of the V substantially centrally thereof and the body of the V substantially above the end of the chute at the end of its stroke.

7. In a picker motion for a loom having a frame having end walls, a main drive shaft extending longitudinally of said loom mounted on said end walls, a picker stick for each end of the loom having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, said picker shaft having a plurality of flat sides, and brackets projecting inwardly from the front and rear of each frame side wall for supporting the ends of each picker shaft, a central supporting bracket for each picker shaft substantially adjacent each shoe, comprising an open housing mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket raised from the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, said end walls also having downwardly bowed cutaway portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein and a centrally split cylindrical washer for each end of said picker shaft within the housing exterior of said floating bearing member and adjacent the side wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket and a cover for said housing, having lubricant deflecting strips projecting downwardly transversely thereof in V shaped formation, with the tip of the V substantially centrally thereof and the body of the V substantially above the end of the chute at the end of its stroke.

8. In a picker motion for a loom having a frame having end walls at each end thereof, a main drive shaft extending longitudinally of said loom mounted on said end walls, a picker stick for each end of the loom, having means to urge its lower end to its innermost position, a picker shaft extending transversely of each end of the loom immediately adjacent each end wall, each having an actuating arm projecting upwardly therefrom connectable to a lug strap connected to a picker stick and having a shoe rigidly mounted thereon having an upper forwardly and downwardly inclined arcuate cam surface projecting inwardly thereof adapted to be abutted by a picker arm to be oscillated inwardly on each rotation of said drive shaft, and brackets projecting inwardly from the front and rear of each frame side wall for supporting the ends of each picker shaft, a central supporting bracket for each picker shaft substantially adjacent each shoe, comprising an open housing mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket raised from the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member and a centrally split cylindrical washer for each end of said picker shaft within the housing adjacent the side wall to dam the flow of lubricant having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing, having lubricant deflecting strips projecting downwardly transversely thereof in V-shaped formation, with the tip of the V substantially centrally thereof and the body of the V substantially above the end of the chute at the end of its stroke.

9. A central supporting bracket for the center of a loom picker shaft immediately adjacent the shoe thereof, comprising a generally rectangular housing adapted to be mounted on a frame end wall, having an open top, a supporting arm projecting upwardly and outwardly centrally therefrom, having a single bolt hole therein for mounting on the frame and having downwardly bowed cut away portions centrally of the upper portion of each end wall thereof to receive the picker shaft therethrough, adapted to contain liquid lubricant in use therein to within a spaced distance below the lower ends of the open portions and a central, partially spherical socket raised from the upper surface of the lower wall thereof, a floating semi-cylindrical bearing member for each picker shaft, having a co-operating partially spherical protuberance projecting downwardly substantially centrally of the lower wall thereof, fitting into said partially spherical socket to permit a slight universal tilting of said bearing member, said end walls also having downwardly bowed cutaway portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein and a centrally split cylindrical washer for each end of said picker shaft within the housing exterior of said floating bearing member and adjacent the side wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing having lubricant deflecting strips projecting downwardly transverse thereof in V-shaped formation, with the tip of the V substantially centrally thereof and the body of the V substantially above the end of the chute at the end of its stroke.

10. A central supporting bracket for the center of a loom picker shaft immediately adjacent the shoe thereof, comprising an open housing adapted to be mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket in the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, said end walls also having open portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein and a cover for said housing.

11. A central supporting bracket for the center of a loom picker shaft immediately adjacent the shoe thereof, comprising an open housing adapted to be mounted on a frame end wall, having an open top, open portions centrally of the upper portion of each end wall thereof to receive the picker shaft therethrough, adapted to contain liquid lubricant in use therein to within a spaced distance below the lower ends of the open portions and a central, partially spherical socket in the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, said end walls also having open portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein, means actuated on rotation of each picker shaft to throw oil over each bearing member, and a cover for said housing.

12. A central supporting bracket for the center of a loom picker shaft immediately adjacent the shoe thereof, comprising an open housing adapted to be mounted on a frame end wall, having an open top, a supporting arm projecting upwardly and outwardly centrally therefrom having a single bolt hole therein for mounting on the frame and having open portions centrally of the upper portion of each end wall thereof to receive the picker shaft therethrough adapted to contain liquid lubricant in use therein to within a spaced distance below the lower ends of the open portions and a central, partially spherical socket in the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member and a cover for said housing.

13. A central supporting bracket for the center of a loom picker shaft immediately adjacent the shoe thereof, comprising an open housing adapted to be mounted on a frame end wall, having an open top, a supporting arm projecting upwardly and outwardly centrally therefrom having means for mounting on the frame and having open portions centrally of the upper portion of each end wall thereof to receive the picker shaft therethrough adapted to contain liquid lubricant in use therein to within a spaced distance below the lower ends of the open portions and a central, partially spherical socket in the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member and a cover for said housing.

14. A central supporting bracket for the center of a loom picker shaft immediately adjacent the shoe thereof, comprising an open housing adapted to be mounted on a frame end wall, having an open top, open portions centrally of the upper portion of each end wall thereof to receive the picker shaft therethrough adapted to contain liquid lubricant in use therein to within a spaced distance below the lower ends of the open portions and a central, partially spherical socket in the upper surface of the lower wall thereof, a floating semi-cylindrical bearing member for each picker shaft, having a cooperating partially spherical protuberance projecting downwardly substantially centrally of the lower wall thereof, fitting into said partially spherical socket to permit a slight universal tilting of said bearing member and a centrally split cylindrical washer for each end of said picker shaft within the housing exterior of said floating bearing member and adjacent the side wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing having lubricant deflecting strips projecting downwardly transversely thereof in V shaped formation, with the tip of the V substantially centrally thereof and the body of the V substantially above the end of the chute at the end of its stroke.

15. A central supporting bracket for the center of a loom picker shaft immediately adjacent the shoe thereof, comprising an open housing adapted to be mounted on a frame end wall, having an open top, open portions centrally of the upper portion of each end wall thereof to receive the picker shaft therethrough adapted to contain liquid lubricant in use therein to within a spaced distance below the lower ends of the open portions and a central, partially spherical socket raised from the upper surface of the lower wall thereof, a floating semi-cylindrical bearing member for each picker shaft, having end walls and a cooperating partially spherical protuberance projecting downwardly substantially centrally of the lower wall thereof, fitting into said partially spherical socket to permit a slight universal tilting of said bearing member, said end walls also having downwardly bowed cutaway portions in the upper ends thereof to receive the picker shaft therein, a supplemental semi-cylindrical bearing member of a length substantially the distance between said end walls contained within the hollow upper surface of said cylindrical bearing member, having an upper surface comprising broken lines forming a transverse socket shaped to receive the flat sides of the lower portion of the picker shaft therein and a centrally split cylindrical washer for each end of said picker shaft within the housing exterior of said floating bearing member and adjacent the side wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing having lubricant deflecting strips projecting downwardly transversely thereof in V shaped formation, with the tip of the V substantially centrally thereof and the body of the V substantially above the end of the chute at the end of its stroke.

16. A central supporting bracket for the center of a loom picker shaft immediately adjacent the shoe thereof, comprising an open housing adapted to be mounted on a frame end wall, having an open top, open portions centrally of the upper portion of each end wall thereof to receive the picker shaft therethrough adapted to contain liquid lubricant in use therein to within a spaced distance below the lower ends of the open portions and a central, partially spherical socket raised from the upper surface of the lower wall thereof, a floating semi-cylindrical bearing member for each picker shaft, having a cooperating partially spherical protuberance projecting downwardly substantially centrally of the lower wall thereof fitting into said partially spherical socket to permit a slight universal tilting of said bearing member and a centrally split cylindrical washer for each end of said picker shaft within the housing exterior of said floating bearing member and adjacent the side wall to dam the flow of lubricant therebetween, having a reduced portion projecting outwardly therefrom through the open portion of each housing end wall, means to clamp said split reduced portions together around said picker shaft, and a bucket member having a side wall thereof attached to the inner wall of each washer, having an open end facing in a vertical position in the direction of rotative movement of its picker shaft when oscillated by its picker arm to splash lubricant upwardly and outwardly over said bearing members, an arcuate chute mounted on said inner wall at a slightly spaced distance from the end of each bucket, a cover for said housing having lubricant deflecting strips projecting downwardly transversely thereof in V shaped formation, with the tip of the V substantially centrally thereof and the body of the V substantially above the end of the chute at the end of its stroke.

ADOLPH MILLETTE.

REFERENCES CITED

The following references are of record in the file of this patent:

UNITED STATES PATENTS

| Number | Name | Date |
|---|---|---|
| 76,092 | Mathews | Mar. 31, 1868 |
| 895,396 | Allison | Aug. 4, 1908 |
| 1,003,868 | Brown | Sept. 19, 1911 |
| 1,722,831 | Wattie | July 30, 1929 |
| 2,351,513 | Hunt | June 13, 1944 |
| 2,468,885 | Santon | Nov. 1, 1949 |